United States Patent
Regnier

(10) Patent No.: US 7,590,661 B2
(45) Date of Patent: Sep. 15, 2009

(54) ADVANCED WEB SERVICES ON A LEGACY PLATFORM

(75) Inventor: Alain Regnier, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 150 days.

(21) Appl. No.: 11/497,000

(22) Filed: Jul. 31, 2006

(65) Prior Publication Data

US 2008/0027988 A1  Jan. 31, 2008

(51) Int. Cl.
*G06F 17/00* (2006.01)
(52) U.S. Cl. ................... 707/104.1; 707/100
(58) Field of Classification Search ............ 707/104.1; 719/319, 328
See application file for complete search history.

(56) References Cited

U.S. PATENT DOCUMENTS

| | | | |
|---|---|---|---|
| 6,405,310 | B1 | 6/2002 | Simpson |
| 6,571,277 | B1 | 5/2003 | Daniel-Barnes et al. |
| 7,127,700 | B2 * | 10/2006 | Large ................ 717/100 |
| 7,373,422 | B1 * | 5/2008 | Paul et al. ............ 709/238 |
| 2004/0121789 | A1 * | 6/2004 | Lindsey ............. 455/517 |
| 2004/0267876 | A1 | 12/2004 | Krishna et al. |
| 2005/0071507 | A1 | 3/2005 | Ferlitsch |
| 2005/0138065 | A1 | 6/2005 | Ciriza |
| 2006/0095541 | A1 | 5/2006 | Sojian et al. |
| 2007/0097969 | A1 | 5/2007 | Regnier |

OTHER PUBLICATIONS

Michael Stal, "Web Services: beyond component-based computing", ACM Oct. 2002, vol. 45, No. 10, pp. 71-76.*
Francois Jammes et al, "Service-oriented device communication using the devices profile for Web services", ACM 2005, 8 pages.*
European Search Report received from corresponding Application No. 07252034.9-2211 dated Dec. 6, 2007.
Ekanayake, J. et al., "Common Architecture for Functional Extensions on Top of Apache Axis 2", XP-002455230, Internet Article [Online] Apr. 24, 2006, 6 pages.
"Axis2 User's Guide", XP002455234, Internet Article, [Online] Mar. 24, 2006, 5 pages.
Buschmann, F. et al., "Pattern-Oriented Software Architecture, vol. 1", XP002455240 (1996) John Wiley and Sons Ltd, pp. 30-39.
"SOAP Engine", XP-002455232, Internet Article [Online] Dec. 6, 2005, 3 pages.
"Axis2 Architecture Guide", XP-002455231, Internet Article [Online] Apr. 7, 2006, pp. 1-11, The Apache Software Foundation homepage.

(Continued)

*Primary Examiner*—Uyen T. Le
(74) *Attorney, Agent, or Firm*—Hickman Palermo Truong & Becker LLP; Daniel D. Ledesma

(57) ABSTRACT

A technique is provided for allowing the implementation of Advanced Web Services on a legacy platform. Logical work is separated into modules and the target platform is abstracted through a simple abstract interface. The implementation of one or more Web Services specifications is packaged into a common module (that may be dynamically or statically loaded) so that the complexity of the Web Services is hidden from developers. Also, SOAP and/or WSDL standards may be packaged and implemented into common modules. Developers may create new services while relying on the common modules.

27 Claims, 4 Drawing Sheets

OTHER PUBLICATIONS

Tost, A., "Web services programming tips and tricks: Using SOAP headers with JAX-RPC", XP-002455233, Internet Article [Online] Oct. 7, 2003, 5 pages.

European Patent Office, "Extended European Search Report," App. No. 06255625.3, dated Feb. 27, 2007, 7 pages.

Haring, Dr., Günther, "Systemarchitektur und Diensts für Allgegenwärtige, Kontext-Sensitive Informationsysteme," Endbericht zum Forschungsauftrag des Bundesministeriums fur Verkehr, Innovation und Technologie, Jan. 1, 2003, pp. 1-135, XP 002420364.

Vedamuthu, Asir s. et al., Web Services Policy 1.5-Primer W3C Working Draft Dec. 21, 2006; http://w3.org/TR/ws-policy-primer/ 30 pgs., print date Mar. 6, 2007.

Wright, Don, "The Ubiquity of Print Enabling Printing within the Ubiquitous Web," http://www.w3.org/2006/02/lexmark-paper.pdf, 8 pgs., print date Mar. 6, 2007.

Jammes, Francois et al., "Service oriented device communications using the devices profile for Web services", ACM 2005, 8 pages.

Stal, Michael, "Web Services: beyond component-based computing", ACM Oct. 2002, vol. 45, No. 10, pp. 71-76.

* cited by examiner

ADVANCED WEB SERVICES ON A LEGACY PLATFORM

CROSS-REFERENCE TO RELATED APPLICATIONS

This application is related to U.S. patent application Ser. No. 11/641,453 filed on Dec. 18, 2006, entitled "WEB SERVICES DEVICE PROFILE ON A MULTI-SERVICE DEVICE: DYNAMIC ADDITION OF SERVICES".

This application is related to U.S. patent application Ser. No. 11/641,454 filed on Dec. 18, 2006, entitled "WEB SERVICES DEVICE PROFILE ON A MULTI-SERVICE DEVICE: DEVICE AND FACILITY MANAGER".

FIELD OF THE INVENTION

The present invention relates to providing Web services, and more particularly to implementing standard Web service protocol on a legacy platform by separating logical work into separate modules.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The term "Web services" describes a standardized way of integrating Web-based applications using the Extensible Markup Language (XML), Simple Object Access Protocol (SOAP), Web Services Description Language (WSDL) standards over an Internet protocol Backbone. XML is used to tag the data, SOAP is used to transfer the data, and WSDL is used for describing the services available. Used primarily as a means for businesses to communicate with each other and with clients, Web services allow organizations to communicate data without intimate knowledge of each other's IT systems behind a firewall.

Web services share business logic, data, and processes through a programmatic interface across a network. Web services allow different applications from different sources to communicate with each other without time-consuming custom coding. And, because all communication is in XML, Web services are not tied to any one operating system or programming language. For example, Java can talk with Python and Windows applications can talk with UNIX applications.

Web Services specifications compose together to provide interoperable protocols for Security, Reliable Messaging, and Transactions in loosely coupled systems. Web Services specifications include both approved standards (e.g. by the World Wide Web Consortium (W3C) and the Organization for the Advancement of Structured Information Standards (OASIS)) and proposed documents and drafts that may become standards.

Many Web Services specifications, in addition to specifications that are planned to be released in the next few years, are relatively complex. Implementing each specification requires complicated development and a high level of expertise from application developers. Furthermore, as more Web Services specifications become standardized, an increasing number of application developers will be unable to develop applications that take full advantage of the additional Web Services specifications.

SUMMARY

An approach is provided for implementing Web Services on a legacy platform. A first Web service application (WSA) receives a SOAP request for a first service. A portion of the SOAP request conforms to a Web Services specification. A library routine from a shared library is invoked based on the portion. The library routine implements one or more functions defined by the Web Services specification. Based on results from the library routine, a device-specific request is generated that conforms to a communications protocol supported by a multi-functional peripheral (MFP) that may include a print process for processing print data and causing a printed version of an electronic document reflected in the print data to be generated. The device-specific request is then transmitted to the MFP.

A second WSA receives a SOAP request for a second service. A portion of the SOAP request conforms to the same Web Services specification. A library routine from the shared library is invoked based on that portion. Based on results from this library routine, a second device-specific request is generated and transmitted to the MFP.

In one approach, a SOAP library routine is invoked that analyzes the first SOAP request and identifies one or more Web Services specifications that are specified in the SOAP request. Results from the SOAP library routine are received at the first WSA. Thus, invoking the library routine is based on the results from the SOAP library routine.

In one approach, the SOAP library routine is shared with the second WSA.

In one approach, if the SOAP request comprises a plurality of portions, then results from the SOAP library routine comprise a plurality of identifiers that each indicate a Web Services specification to which the corresponding portion conforms.

In one approach, a different portion of the SOAP request conforms to a different Web Services specification. Therefore, a different library routine corresponding to the different portion is invoked, from which results are received.

In one approach, another library routine is added to the shared library, wherein the added library routine implements one or more functions defined by a different Web Services specification. Thus, the first and second WSAs may invoke the added library routine if a portion of a subsequent SOAP request conforms to the different Web Services specification.

In one approach, a WSA includes an abstract API that is used to generate the device-specific request. The abstract API defines an interface by which the WSA invokes one or more functions on the MFP.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Figure 1:
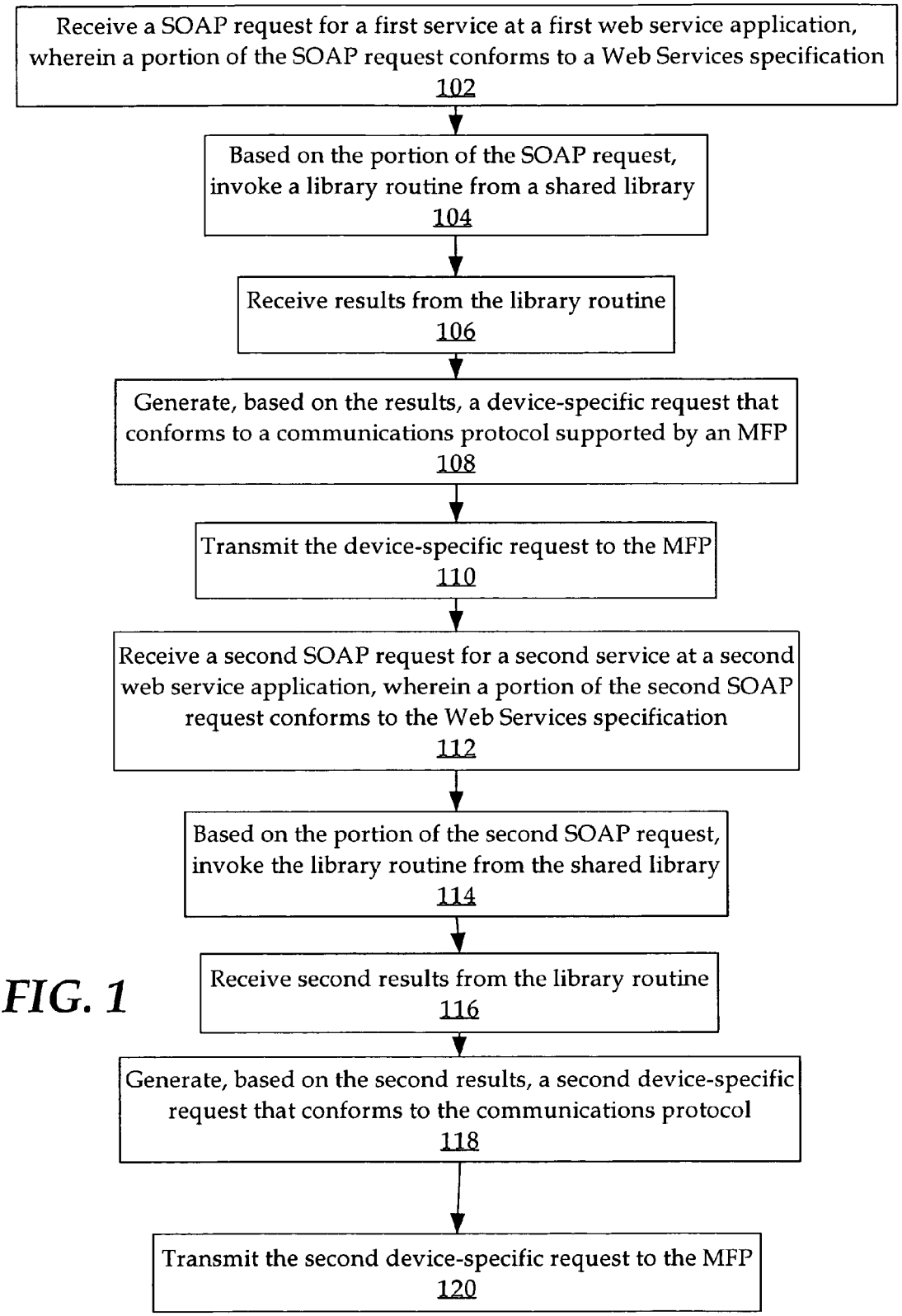
FIG. 1 is a flow diagram that illustrates an approach for processing requests to process data on multi-functional peripherals (MFPs), according to an embodiment of the invention.

FIG. 1 is a flow diagram that illustrates an approach for processing requests to process data on multi-functional peripherals (MFPs), according to one embodiment of the invention. As used herein, the term MFP refers to a device that performs one or more functions, such as printing, copying, facsimile and scanning. FIG. 1 depicts the approach in the context of processing a SOAP request for a device provided by an MFP, although the approach is not limited to the SOAP context. At step 102, a SOAP request for a first service is received at a first web service application. The SOAP request is composed to request a Web service that implements one or more Web Services specifications. A portion of the SOAP request conforms to a first Web Services specification. At step 104, a library routine is invoked from a shared library based on the portion of the SOAP request. The library routine implements one or more functions defined by the first Web Services specification. At step 106, results are received from the library routine. At step 108, a device-specific request is generated based on the results. The device-specific request conforms to a communications protocol supported by a multi-functional peripheral (MFP). The MFP may include a print process for processing print data and causing a printed version of an electronic document reflected in the print data to be generated. At step 110, the device-specific request is transmitted to the MFP.

At step 112, a second SOAP request for a second service is received at a second web service application. A portion of the second SOAP request conforms to the Web Services specification. At step 114, the same library routine is invoked from the shared library based on the portion of the second SOAP request. At step 116, results are received from the library routine invoked in step 114. At step 118, a second device-specific request is generated based on the results received in step 116. The second device-specific request also conforms to the communications protocol. At step 120, the second device-specific request is transmitted to the MFP.

Architectural Overview

Figure 2:
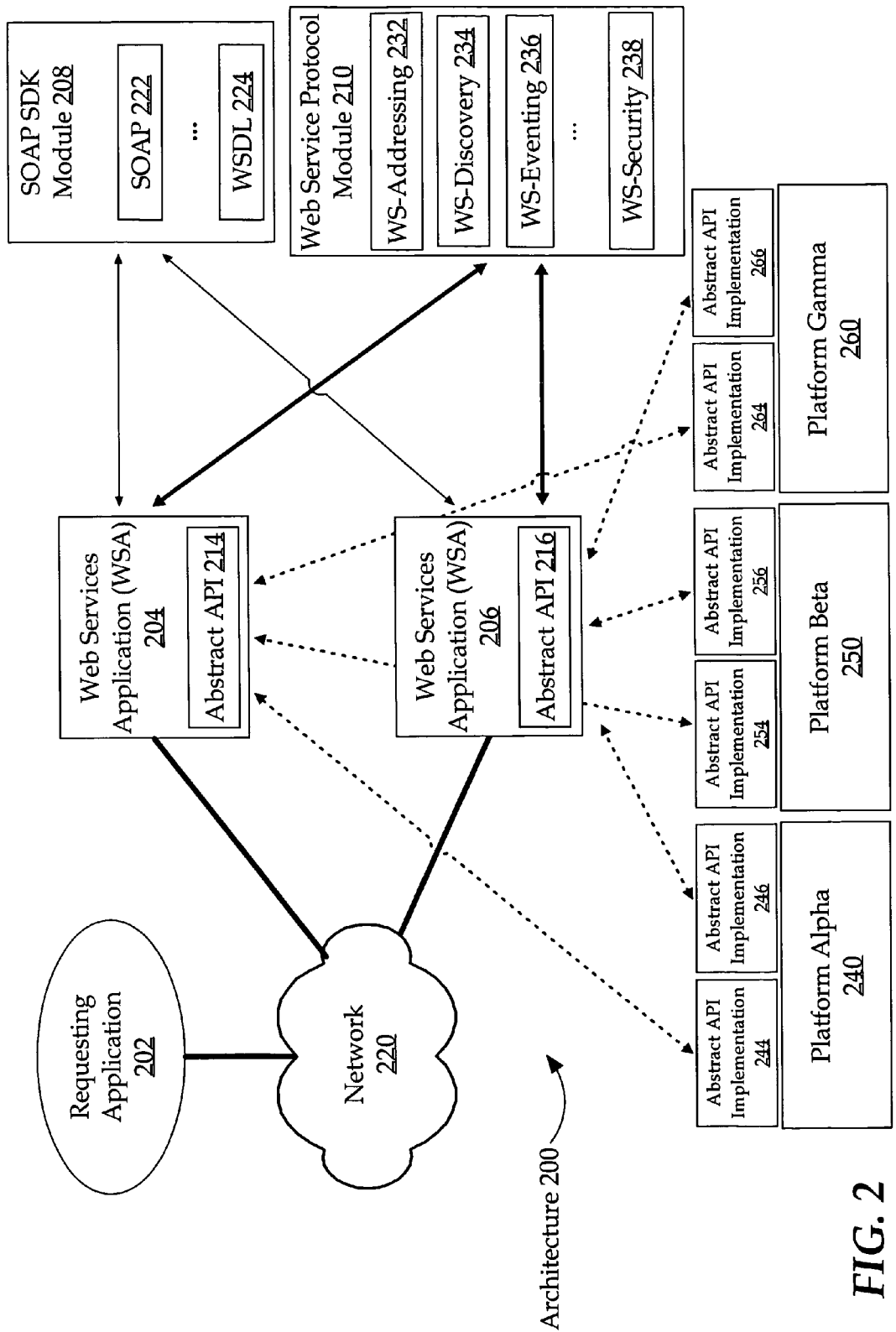
FIG. 2 is a block diagram that illustrates an example architecture for processing requests to process data on MFPs, according to an embodiment of the invention.

FIG. 2 is a block diagram that illustrates an example architecture 200 for processing requests to process data on MFPs, according to one embodiment of the invention. Architecture 200 includes a requesting application 202, a Web services application 204 and 206, a SOAP software development kit (SDK) module (SSM) 208, a Web Services protocol module (WSPM) 210, and a network 220, according to an embodiment of the invention. Requesting application 202 is an application that requests a Web service using the SOAP protocol. Web services application (WSA) 204 receives requests for one or more Web services. SSM 208 provides, to WSA 204 and WSA 206, library routines to analyze SOAP messages and generate SOAP messages. WSPM 210 provides library routines, corresponding to one or more Web Services specifications, to WSA 204 and WSA 206.

For example, requesting application 202 sends a SOAP request (e.g. over network 220) to WSA 204. By definition, the SOAP request comprises a header section and a body section. The header section comprises one or more portions, each corresponding to and requiring a standard Web Services protocol, such as WS-Security. If WSA 204 is not configured to analyze SOAP messages, then WSA 204 may invoke a SOAP library routine provided by SSM 208 in order to understand the structure of the SOAP request. The results of invoking the SOAP library routine on the SOAP request includes 1) an indication that the SOAP request is valid and 2) a set of identifiers that identify one or more Web Services specifications that are specified in the SOAP request.

Based on the results, WSA 204 invokes at least one library routine from WSPM 210 which acts as a shared library. The library routine implements one or more functions defined by a Web Services specification. Based on the results from invoking the library routine, WSA 204 generates a device-specific request that conforms to a communications protocol supported by a MFP (e.g. using an abstract API via Abstract API 214). WSA 204 then transmits the device-specific request to the MFP.

If requesting application 202 requires the service(s) provided by WSA 206, then WSA 206 may also utilize the library routines provided by SOAP SDK 208 and WSPM 210.

Requesting Application

Requesting application 202 is an application that is associated with a process that requests a particular Web service provided by WSA 204 or WSA 206. Requesting application 202 is typically an application associated with the operating system that supports the initial requesting process. A purpose of requesting application 202 is to convert a platform-specific procedure call, from a requesting process, to a SOAP request that can be processed by an application that "understands" SOAP. On the other hand, requesting application 202 may be a GUI that a user interacts with. In this case, requesting application 202 converts user clicks into SOAP requests.

For example, the requesting process may be associated with a Microsoft Word application and WSA 204 may be a print application. Requesting application 202 receives a platform-specific "print data" request sent from the requesting process. Requesting application 202 encodes the print data request in a SOAP message that can be processed by WSA 204 that "understands" SOAP messages.

Network

SOAP communications between requesting application 202 and WSA 204 may be made over network 220. Network 220 may be implemented by any medium or mechanism that provides for the exchange of data between various nodes in network 220. Examples of such a network include, without limitation, a network such as a Local Area Network (LAN), Wide Area Network (WAN), Ethernet or the Internet, or one or more terrestrial, satellite, or wireless links. Network 220 may include a combination of networks such as those described. Network 220 may transmit data according to Transmission Control Protocol (TCP) and Internet Protocol (IP).

Web Services Application

Web services application (WSA) 204 and WSA 206 are modules that provide services and that rely on Web Services protocols and technologies, such as those protocols supported by WSPM 210. WSA 204 and WSA 206 may also rely on the routines provided by SSM 208 if the respective applications are not configured to analyze SOAP messages.

In one embodiment, WSA 204 and WSA 206 have a socket where the respective applications "listen" for SOAP requests. WSA 204 and WSA 206 may be configured to listen for SOAP requests at the same socket or at different sockets.

Soap SDK Module

SOAP (Simple Object Access Protocol) is a XML-based messaging protocol used to encode the information in Web service request and response messages before sending them over a network. SOAP messages are independent of any operating system or protocol and may be transported using a variety of Internet protocols, including SMTP, MIME, and typically HTTP.

The Web Services Description Language (WSDL) is an XML format published for describing Web services. WSDL describes the public interface to a particular Web service. WSDL is an XML-based service description on how to communicate using the Web service. A WSDL file describes the protocol bindings and message formats required to interact with the Web services listed in its directory. The supported operations and messages are described abstractly, and then bound to a concrete network protocol and message format.

WSDL is often used in combination with SOAP and XML Schema to provide Web services over the internet. A client program (e.g. requesting application 202) connecting to a Web service (e.g. WSA 204) may read the WSDL file corresponding to the Web service and determine what functions the Web service supports. Any special datatypes used are embedded in the WSDL file in the form of XML Schema. The client program can then use SOAP to invoke one of the functions listed in the WSDL file.

According to an embodiment, SOAP SDK module (SSM) 208 is a shared library of library routines that implement one or more functions defined by SOAP and/or WSDL. SOAP 222 comprises one or more library routines corresponding to SOAP. The one or more library routines corresponding to SOAP may be associated with the SOAP 1.2 standard or any other version of SOAP. Similarly, WSDL 224 comprises one or more library routines corresponding to WSDL. The one or more library routines corresponding to WSDL may be associated with the WSDL 1.2 standard or any other version of WSDL. SSM 208 may comprise library routines corresponding to older versions of SOAP and WSDL so that requesting applications 202 may operate under the older versions.

A WSA may invoke library routines provided by SOAP 222 to 1) generate a SOAP message and/or 2) parse a SOAP request that the WSA has received. A WSA may also invoke library routines provided by WSDL 224 to package WSDL documents to send to requesting application 202. WSDL 224 is used to analyze a given WSDL document and generate stubs and skeletons during the development phase. At runtime, WSDL 224 is used to map incoming requests to the corresponding functions "inside" WSA 204 or 206. WSDL 224 is not required to generate the WSDL document for the outside because the document is typically a simple text file.

In one embodiment, SSM 208 is implemented as a set of static or dynamic library routines which WSA 204 and WSA 206 may each load into their respective memories. Therefore, WSA 204 and WSA 206 may each invoke different copies of the same library routine. In another embodiment, WSA 204 and WSA 206 invoke a library routine using an API associated with SSM 208. The API defines an interface by which the associated WSA invokes one or more functions on SSM 208. In this case, SSM 208 implements the functions specified in the library routine and returns the results to the WSA that invoked the library routine.

If the WSA invokes a SOAP library routine, then the structure of the SOAP request is analyzed (either locally, in the case of loading the library routine into memory, or by SSM 208, in the case of SSM 208 implementing the function(s) specified in the library routine). If the structure of the SOAP request is valid, then the one or more portions of the SOAP request are identified. Each portion specifies a particular Web Services specification. Results from executing the SOAP library routine may comprise data structures that contain pointers to each portion with an identifier that indicates the Web Services specification or the name of the namespace of the Web Services specification.

Each Web Services specification has an associated namespace. The namespace identifies a particular Web Services specification. Each version of a particular Web Services specification is associated with a different namespace. Therefore, WSDL 1.1 and WSDL 1.2 are associated with different namespaces.

Web Services Protocol Module

Web Services protocol module (WSPM) 210 functions as a shared library of library routines that each implement one or more functions defined by one or more Web Services specifications. A WSA knows which library routine(s) to invoke based on the results of invoking one or more SOAP library routines to analyze the SOAP request.

In one embodiment, WSPM 210 may be implemented as a set of static or dynamic library routines which WSA 204 and WSA 206 may each load separately into memory. Therefore, WSA 204 and WSA 206 may each invoke different copies of the same library routine. In another embodiment, WSA 204 and WSA 206 invoke a library routine using an API associated with WSPM 210. The API defines an interface by which the associated WSA invokes one or more functions on WSPM 210. In this case, WSPM 210 implements the functions specified in the library routine and returns the results to the WSA that invoked the library routine.

According to an embodiment, WSPM 210 comprises one or more library routines corresponding to at least one Web Services specification. WSPM 210 may be configured to comprise library routines that correspond to multiple Web Services specifications and multiple versions of one or more Web Services specifications.

Web Services specifications include standards for messaging, security, transactions, and policy. Web Services messaging specifications include, without limitation, WS-Addressing, WS-Eventing, and WS-Transfer. WS-Security is a well-known security specification. Web Services transaction specifications include, without limitation, WS-Coordination and WS-BusinessActivity. Web Services metadata specifications include, without limitation, WSDL, WS-MetadataExchange, and WS-Policy. Many other specifications are currently in the proposal phase and will eventually become W3C standards.

Multiple WSAs may invoke the library routines defined in WSPM 210. Therefore, multiple WSAs may benefit from one WSPM 210 without a WSA developer having to know many details about the Web Services specifications implemented on WSPM 210.

Abstract API

According to an embodiment, WSA 204 and WSA 206 may use an abstract API, such as abstract API 214 for WSA 204 and abstract API 216 for WSA 206, in order to generate device-specific requests. The abstract API defines an interface by which the associated WSA invokes one or more functions on the MFP. Therefore, according to this embodiment, a developer of WSA 204 and/or WSA 206 is not required to know the underlying complexities of the target platform, but only of the new service that the developer aims to provide.

Abstract API Implementation

If an abstract API has been defined for a WSA, then an implementation of the abstract API for a specific platform must be defined. For example, an abstract API implementation 244 is defined for abstract API 214 on a platform alpha 240. Similarly, an abstract API implementation 266 is defined for abstract API 216 on a platform gamma 260. A corresponding abstract API implementation defines the functions specified in a device-specific request and implemented on the MFP. With this architecture, only the implementer of the abstract API needs to have knowledge of the target platform, whereas the developer of the WSA is not so required.

Example

Figure 3:
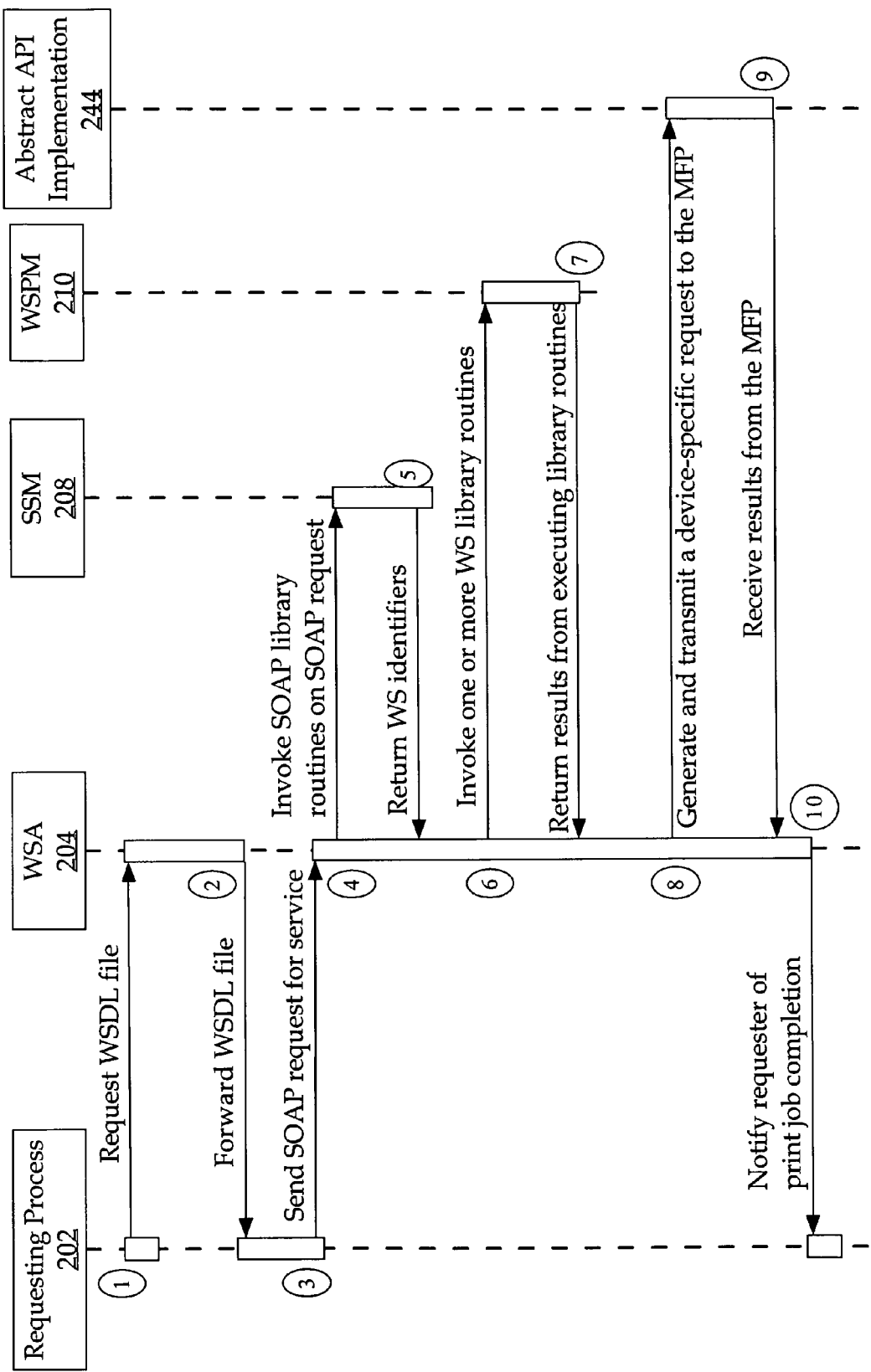
FIG. 3 is a sequence diagram illustrating an example of how a SOAP request for a printing service may be processed, according to an embodiment of the invention

FIG. 3 illustrates an example of how a SOAP request for a printing service may be processed, according to an embodiment of the invention. Initially, requesting application 202 receives a platform-specific request from a word processing application (not shown) to print an electronic document. The request indicates that the electronic document should be encrypted and that the user of the word processing application wants to be notified when the print job is fully executed (i.e. the entire electronic document is printed).

At step 1, requesting application 202 may initially send a SOAP request for the WSDL file associated with WSA 204 that handles print requests. WSA 204 executes on a MFP that provides one or more services in addition to a printing service, such as a faxing service, a scanning service, and an archiving service. Therefore, the MFP includes at least a print process for processing print data and causing a printed version of an electronic document reflected in the print data to be generated.

At step 2, WSA 204 sends the WSDL file to requesting application 202 over network 220. The WSDL file lists the functions that WSA 204 supports. If WSA 204 does not include functionality to analyze SOAP messages, then WSA 204 may forward the SOAP request to SSM 208. SSM 208 then may extract the details of the request and send them to WSA 204 (step 3).

If the WSDL file indicates that WSA 204 and its associated MFP does not support the functionality that the requesting process requires (e.g. encryption), then requesting application may attempt to discover another WSA that supports the requested functionality.

If WSA 204 and the MFP support the requested functionality, then requesting application 202 converts the platform-specific request into a SOAP request (e.g. using the WSDL file) and sends the SOAP request, over network 220, to WSA 204 (step 3).

The header of the SOAP request comprises one or more portions that each correspond to a particular Web Services specification. According to this example, the header of the SOAP request includes a portion that corresponds to the WS-Eventing specification (for notifying requesting application 202 when the print job is fully executed) and another portion that conforms to the WS-Security specification (for specifying the encryption process used to encrypt the electronic document). The body of the SOAP request comprises the encrypted electronic document.

WSA 204 receives the SOAP request and invokes a SOAP library routine provided by SSM 208 (step 4) (e.g. by using a SOAP API associated with WSA 204) if WSA 204 does not already include an implementation of the appropriate SOAP specification to which a portion of the SOAP request conforms. SSM 208 analyzes the structure of the SOAP request. The results from the SOAP library routine include identifiers that identify WS-Security and WS-Eventing as the Web Services specifications specified in the SOAP request. The results are returned to WSA 204 (step 5).

At step 6, based on the results from the SOAP library routine, WSA 204 invokes at least one library routine defined in WSPM 210. In this example, WSA 204 invokes one or more library routines, corresponding to WS-Security, that implement decryption of the print data in the SOAP request. By invoking the library routine, the security mechanism is determined, the key is identified, and the electronic document in the SOAP request is decrypted.

After WS-Security 238 decrypts the electronic document, WSPM 210 returns the decrypted electronic document to WSA 204 (step 7). At step 8, WSA 204 uses abstract API 214 to generate a device-specific print function call and transmit the print function call to the target platform (e.g., platform alpha 240). The corresponding abstract API implementation (e.g., implementation 244) implements the print function call. However, after the decryption, if WSA 204 determines that the electronic document is in a format that platform alpha 240 does not "understand", then the print job may be aborted.

When the print job is fully executed, platform alpha 240 invokes a callback to WSA 204 (e.g., via abstract implementation 244) notifying WSA 204 of this event (step 10). WSA 204 invokes one or more library routines corresponding to WS-Eventing 236. The results from executing these library routines is used when invoking one or more SOAP library routines corresponding to SOAP 222 in order to generate a SOAP message to application 202 if it has previously requested to receive such notifications, through a different SOAP message. The SOAP response indicates that the print job is fully executed.

If there are applications that have previously registered to be notified of events, then eventing notifications are sent based on callbacks from the corresponding abstract API (e.g., abstract API 244). If no application has registered, then an eventing message is not sent.

If the original SOAP request comprises of a portion that conforms to a Web Services specification that is not implemented by library routines defined in WSPM 210, then WSA 204 may still attempt to execute the SOAP request using the other Web Services specifications indicated in the SOAP request. In this way, WSA 204 may service some SOAP requests that WSA 204 would otherwise abort or ignore.

However, a SOAP request from requesting application 202 may indicate a certain policy (e.g. according to WS-Policy) that each portion in the SOAP request corresponding to a Web Services specification must be implemented. In such a case where a SOAP request indicates the aforementioned policy, if WSPM 210 does not support a Web Services specification specified in the SOAP request, then the entire SOAP request may be discarded and an error message may be sent to requesting application 202.

Implementation Mechanisms

Figure 4:
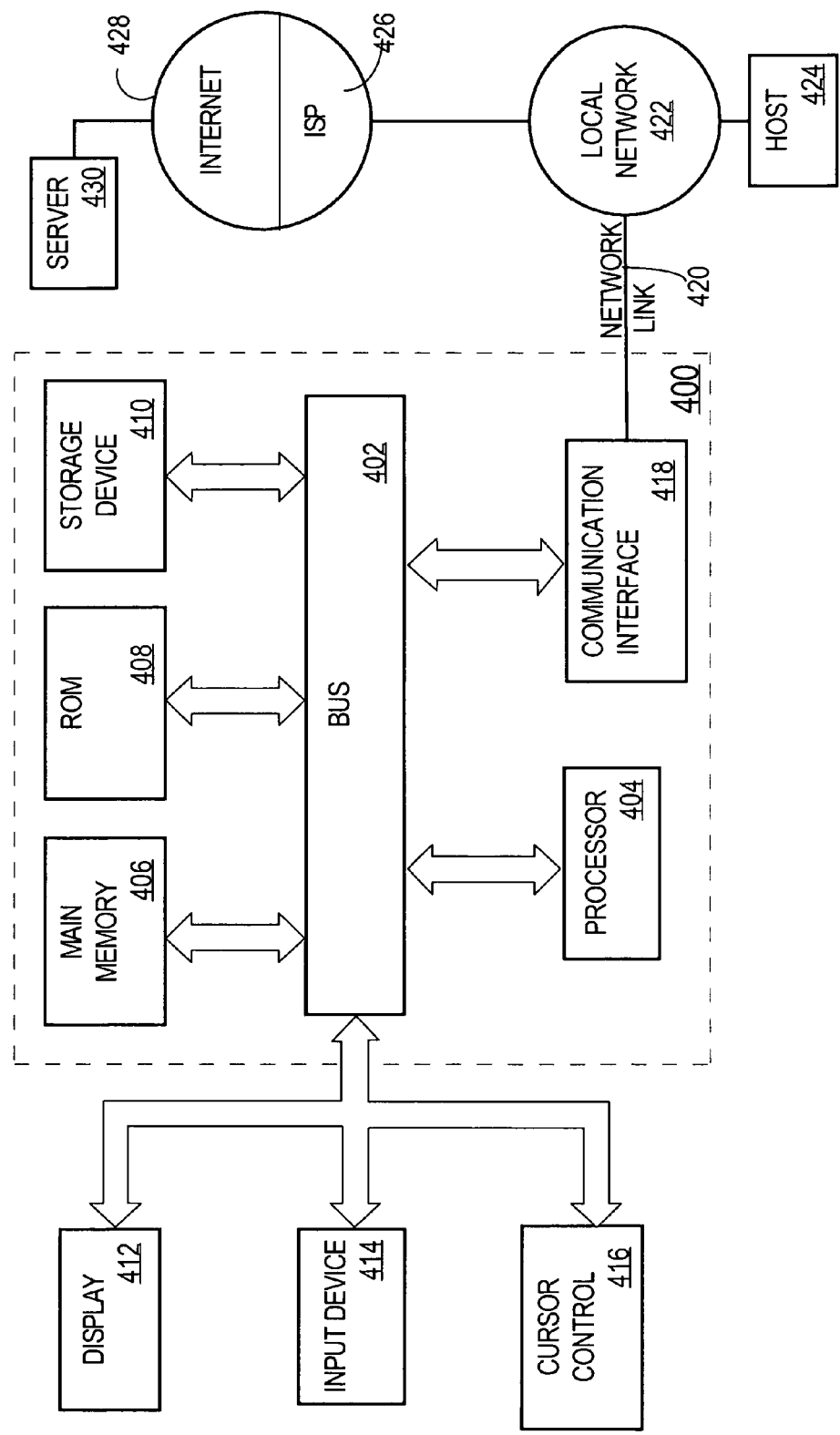
FIG. 4 is a block diagram that illustrates a computer system upon which an embodiment of the invention may be implemented.

The approach described herein for providing Web Services protocol to Web service applications may be implemented on any type of computing platform or architecture. FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for processing requests to process data on multi-functional peripherals (MFPs), the method comprising:

receiving, at a first web service application, a first Simple Object Access Protocol (SOAP) request for a first service, wherein a first portion of the first SOAP request conforms to a first Web Services specification;

based on the first portion of the first SOAP request, the first web service application invoking a first library routine from a shared library, wherein the first library routine implements one or more functions defined by the first Web Services specification;

receiving, at the first web service application, first results from the first library routine;

the first web service application generating, based on the first results, a first device-specific request that conforms to a communications protocol supported by a MFP;

the first web service application transmitting the first device-specific request to the MFP;

receiving, at a second web service application, a second SOAP request for a second service, wherein a first portion of the second SOAP request conforms to the first Web Services specification;

based on the first portion of the second SOAP request, the second web service application invoking the first library routine from the shared library;

receiving, at the second web service application, second results from the first library routine;

the second web service application generating, based on the second results, a second device-specific request that conforms to the communications protocol; and the second web service application transmitting the second device-specific request to the MFP.

2. The method of claim 1, wherein the MFP includes a print process for processing print data and causing a printed version of an electronic document reflected in the print data to be generated.

3. The method of claim 1, wherein the first Web Services specification is one of the following: WS-Addressing, WS-Discovery, WS-Eventing, WS-Security, WS-MetadataExchange, WS-Policy, WS-Transaction, WS-BusinessActivity, WS-Coordination, and WS-Transfer.

4. The method of claim 1, further comprising:

before invoking the first library routine based on the first portion of the first SOAP request, the first web service application invoking a SOAP library routine that analyzes the first SOAP request and identifies one or more Web Services specifications that are specified in the first SOAP request; and in response to invoking the SOAP library routine, receiving, at the first web service application, third results from the SOAP library routine, wherein the step of invoking a first library routine from a shared library is based on the third results.

5. The method of claim 4, further comprising:

before invoking the first library routine based on the first portion of the second SOAP request, the second web service application invoking the SOAP library routine that analyzes the second SOAP request and identifies one or more Web Services specifications that are specified in the second SOAP request; and in response to invoking the SOAP library routine that analyzes the second SOAP request, receiving, at the second web service application, fourth results from the SOAP library routine, wherein the step of invoking the first library routine from the shared library is based on the fourth results.

6. The method of claim 4, wherein:

the first SOAP request comprises a plurality of portions;

the third results comprise a plurality of identifiers; and each identifier of the plurality of identifiers indicates a Web Services specification to which a portion of the plurality of portions conforms.

7. The method of claim 1, further comprising:

based on the first SOAP request, the first web service application invoking a second library routine, wherein:

the second library routine corresponds to a different portion of the first SOAP request;

the different portion of the first SOAP request conforms to a second Web Services specification; and the second library routine implements one or more functions defined by the second Web Services specification; and receiving, at the first web service application, third results from the second library routine.

8. The method of claim 1, further comprising:

adding a second library routine to the shared library, wherein the second library routine implements one or more functions defined by a second Web Services specification;

receiving, at the first web service application, a third SOAP request for the first service, wherein a first portion of the third SOAP request conforms to the second Web Services specification;

based on the first portion of the third SOAP request, the first web service application invoking the second library routine;

receiving, at the first web service application, third results from the second library routine;

the first web service application generating, based on the third results, a third device-specific request that conforms to the communications protocol; and the first web service application transmitting the third device-specific request to the MFP.

9. The method of claim 1, wherein the step of generating a first device-specific request includes using an abstract API associated with the first web service application, wherein the abstract API defines an interface by which the first web service application invokes one or more functions on the MFP.

10. A machine-readable storage medium for processing requests to process data on multi-functional peripherals (MFPs), the machine-readable storage medium storing instructions which, when processed by one or more processors, cause:

receiving, at a first web service application, a first Simple Object Access Protocol (SOAP) request for a first service, wherein a first portion of the first SOAP request conforms to a first Web Services specification;

based on the first portion of the first SOAP request, the first web service application invoking a first library routine from a shared library, wherein the first library routine implements one or more functions defined by the first Web Services specification;

receiving, at the first web service application, first results from the first library routine;

the first web service application generating, based on the first results, a first device-specific request that conforms to a communications protocol supported by a MFP;

the first web service application transmitting the first device-specific request to the MFP;

receiving, at a second web service application, a second SOAP request for a second service, wherein a first portion of the second SOAP request conforms to the first Web Services specification;

based on the first portion of the second SOAP request, the second web service application invoking the first library routine from the shared library;

receiving, at the second web service application, second results from the first library routine;

the second web service application generating, based on the second results, a second device-specific request that conforms to the communications protocol; and the second web service application transmitting the second device-specific request to the MFP.

11. The machine-readable storage medium of claim 10, wherein the MFP includes a print process for processing print data and causing a printed version of an electronic document reflected in the print data to be generated.

12. The machine-readable storage medium of claim 10, wherein the first Web Services specification is one of the following: WS-Addressing, WS-Discovery, WS-Eventing, WS-Security, WS-MetadataExchange, WS-Policy, WS-Transaction, WS-BusinessActivity, WS-Coordination, and WS-Transfer.

13. The machine-readable storage medium of claim 10, further comprising one or more additional instructions which, when processed by the one or more processors, cause:

before invoking the first library routine based on the first portion of the first SOAP request, the first web service application invoking a SOAP library routine that analyzes the first SOAP request and identifies one or more Web Services specifications that are specified in the first SOAP request; and in response to invoking the SOAP library routine, receiving, at the first web service application, third results from the SOAP library routine, wherein the step of invoking a first library routine from a shared library is based on the third results.

14. The machine-readable storage medium of claim 13, further comprising one or more additional instructions which, when processed by the one or more processors, cause:

before invoking the first library routine based on the first portion of the second SOAP request, the second web service application invoking the SOAP library routine that analyzes the second SOAP request and identifies one or more Web Services specifications that are specified in the second SOAP request; and in response to invoking the SOAP library routine that analyzes the second SOAP request, receiving, at the second web service application, fourth results from the SOAP library routine, wherein the step of invoking the first library routine from the shared library is based on the fourth results.

15. The machine-readable storage medium of claim 13, wherein:

the first SOAP request comprises a plurality of portions;

the third results comprise a plurality of identifiers; and each identifier of the plurality of identifiers indicates a Web Services specification to which a portion of the plurality of portions conforms.

16. The machine-readable storage medium of claim 10, further comprising one or more additional instructions which, when processed by the one or more processors, cause:

based on the first SOAP request, the first web service application invoking a second library routine, wherein:
the second library routine corresponds to a different portion of the first SOAP request;
the different portion of the first SOAP request conforms to a second Web Services specification; and
the second library routine implements one or more functions defined by the second Web Services specification; and receiving, at the first web service application, third results from the second library routine.

17. The machine-readable storage medium of claim 10, further comprising one or more additional instructions which, when processed by the one or more processors, cause:

adding a second library routine to the shared library, wherein the second library routine implements one or more functions defined by a second Web Services specification;

receiving, at the first web service application, a third SOAP request for the first service, wherein a first portion of the third SOAP request conforms to the second Web Services specification;

based on the first portion of the third SOAP request, the first web service application invoking the second library routine;

receiving, at the first web service application, third results from the second library routine;

the first web service application generating, based on the third results, a third device-specific request that conforms to the communications protocol; and the first web service application transmitting the third device-specific request to the MFP.

18. The machine-readable storage medium of claim 10, wherein the generating a first device-specific request includes using an abstract API associated with the first web service application, wherein the abstract API defines an interface by which the first web service application invokes one or more functions on the MFP.

19. An apparatus for processing requests to process data on multi-functional peripherals (MFPs), the apparatus comprising a memory storing instructions which, when executed by one or more processors, cause:

receiving, at a first web service application, a first Simple Object Access Protocol (SOAP) request for a first service, wherein a first portion of the first SOAP request conforms to a first Web Services specification;

based on the first portion of the first SOAP request, the first web service application invoking a first library routine from a shared library, wherein the first library routine implements one or more functions defined by the first Web Services specification;

receiving, at the first web service application, first results from the first library routine;

the first web service application generating, based on the first results, a first device-specific request that conforms to a communications protocol supported by a MFP;

the first web service application transmitting the first device-specific request to the MFP;

receiving, at a second web service application, a second SOAP request for a second service, wherein a first portion of the second SOAP request conforms to the first Web Services specification;

based on the first portion of the second SOAP request, the second web service application invoking the first library routine from the shared library;

receiving, at the second web service application, second results from the first library routine;

the second web service application generating, based on the second results, a second device-specific request that conforms to the communications protocol; and the second web service application transmitting the second device-specific request to the MFP.

20. The apparatus of claim 19, wherein the MFP includes a print process for processing print data and causing a printed version of an electronic document reflected in the print data to be generated.

21. The apparatus of claim 19, wherein the first Web Services specification is one of the following: WS-Addressing, WS-Discovery, WS-Eventing, WS-Security, WS-Coordination, WS-MetadataExchange, WS-Policy, WS-Transaction, WS-Busines sActivity, and WS-Transfer.

22. The apparatus of claim 19, wherein the memory further stores additional instructions which, when processed by the one or more processors, causes:

before invoking the first library routine based on the first portion of the first SOAP request, the first web service application invoking a SOAP library routine that analyzes the first SOAP request and identifies one or more Web Services specifications that are specified in the first SOAP request; and in response to invoking the SOAP library routine, receiving, at the first web service application, third results from the SOAP library routine, wherein the step of invoking a first library routine from a shared library is based on the third results.

23. The apparatus of claim 22, wherein the memory further stores additional instructions which, when processed by the one or more processors, causes:

before invoking the first library routine based on the first portion of the second SOAP request, the second web service application invoking the SOAP library routine that analyzes the second SOAP request and identifies one or more Web Services specifications that are specified in the second SOAP request; and in response to invoking the SOAP library routine that analyzes the second SOAP request, receiving, at the second web service application, fourth results from the SOAP library routine, wherein the step of invoking the first library routine from the shared library is based on the fourth results.

24. The apparatus of claim 22, wherein:

the first SOAP request comprises a plurality of portions;

the third results comprise a plurality of identifiers; and each identifier of the plurality of identifiers indicates a Web Services specification to which a portion of the plurality of portions conforms.

25. The apparatus of claim 19, wherein the memory further stores additional instructions which, when processed by the one or more processors, causes:

based on the first SOAP request, the first web service application invoking a second library routine, wherein:

the second library routine corresponds to a different portion of the first SOAP request;

the different portion of the first SOAP request conforms to a second Web Services specification; and the second library routine implements one or more functions defined by the second Web Services specification; and receiving, at the first web service application, third results from the second library routine.

26. The apparatus of claim 19, wherein the memory further stores additional instructions which, when processed by the one or more processors, causes:

adding a second library routine to the shared library, wherein the second library routine implements one or more functions defined by a second Web Services specification;

receiving, at the first web service application, a third SOAP request for the first service, wherein a first portion of the third SOAP request conforms to the second Web Services specification;

based on the first portion of the third SOAP request, the first web service application invoking the second library routine;

receiving, at the first web service application, third results from the second library routine;

the first web service application generating, based on the third results, a third device-specific request that conforms to the communications protocol; and the first web service application transmitting the third device-specific request to the MFP.

27. The apparatus of claim 19, wherein the generating a first device-specific request includes using an abstract API associated with the first web service application, wherein the abstract API defines an interface by which the first web service application invokes one or more functions on the MFP.

* * * * *